United States Patent Office 3,063,266
Patented Nov. 13, 1962

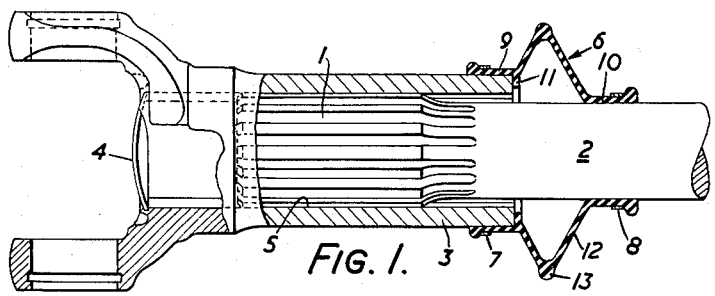
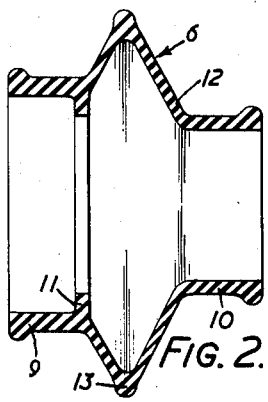
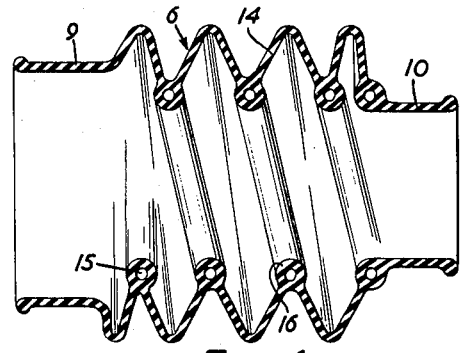
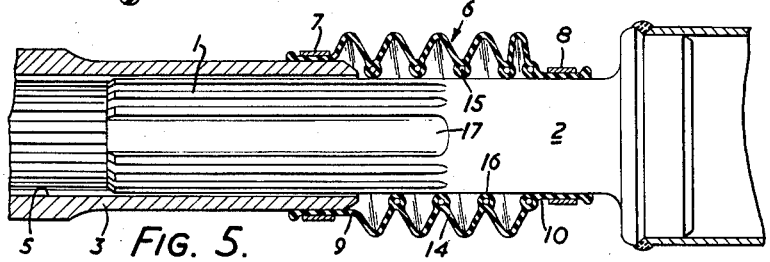
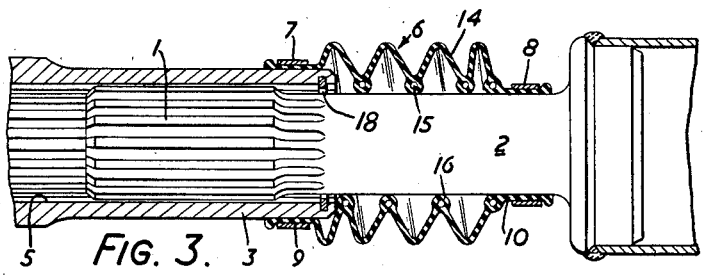

3,063,266
MECHANISMS COMPRISING A PLUNGER SLIDING WITHIN A CYLINDER AND LUBRICATION ARRANGEMENTS THEREFOR
Edward John Rabson, Radford Semele, England, assignor to Birfield Engineering Limited, London, England
Filed June 1, 1959, Ser. No. 817,388
Claims priority, application Great Britain June 5, 1958
11 Claims. (Cl. 64—32)

This invention relates to mechanisms of the kind comprising a plunger sliding within a cylinder, and to the lubrication of such mechanisms. An example of this kind of mechanism in which the plunger not only slides within the cylinder but also rotates in driving engagement therewith is a sliding joint of a power transmission shaft, for instance a sliding spline of a motor vehicle propeller shaft.

In the conventional arrangement of sliding spline on a propeller shaft a seal is formed between the splined male portion of the shaft (which forms the aforesaid plunger) and the universal joint spline yoke (forming the aforesaid cylinder) by means of a felt ring arranged at the outer end of the spline yoke and held in place by a split ring and screwed ferrule. The inner end of the bore of the spline yoke is closed by a blanking plate for the purpose of maintaining lubricant on the spline and preventing ingress of foreign matter. However, to prevent the compression which would otherwise occur in the closed end of the spline yoke when the splined portion of the shaft slides towards such closed end, the blanking plate has to be provided with a small hole therein but, in addition to preventing air compression, this hole enables lubricant to escape from and foreign matter to enter the sliding spline.

Among the objects of the present invention is specifically to overcome the foregoing disadvantage of the conventional arrangement of sliding spline and, more generally, to provide new or improved lubrication arrangements for mechanisms of the kind comprising a plunger sliding within a cylinder. A further object is to provide an improved mechanism of this kind which can be packed with lubricant and will require no further lubrication for the duration of its working life.

According to the invention there is provided a lubrication arrangement for a mechanism of the kind set forth wherein one end of the cylinder is completely closed and a chamber is formed between the cylinder and the plunger sliding therein, the arrangement being such that air and lubricant are enabled to escape from the closed end of the cylinder into said chamber when the plunger moves towards said closed end and to return to the closed end of the cylinder again when the plunger is withdrawn therefrom.

Preferably the said chamber is of variable volume, its volume and change of volume being matched to the clearance volume between the plunger and cylinder and to the rate of change of such clearance volume, and varying inversely as the latter; in other words the sum of the clearance volume between the plunger and cylinder and the volume of the chamber is a constant. The chamber may comprise a bellows having its ends sealed to the plunger and the open end of the cylinder respectively.

If desired the bellows may be moulded in a preformed state of partial axial collapse to which it returns automatically when released after being axially extended. The arrangement may be such that the bellows has maximum capacity when partially axially collapsed, i.e. its position when the plunger is in its innermost position, and minimum capacity when the plunger is at its position of maximum withdrawal from the cylinder.

Further, the construction of the bellows is such as to provide a through space from one end of the bellows to the other, the bellows being preferably of helical form for this purpose. As applied to a mechanism in which the plunger not only slides within the cylinder but also rotates in driving engagement therewith, means are preferably provided for accurately locating the bellows about the axis of the plunger and supporting said bellows so that the effect of lubricant therein does not produce an unbalanced force during rotation of the plunger and cylinder assembly.

The invention will now be further described with reference to the accompanying drawings which illustrate, by way of example, three embodiments of the invention as carried into effect in connection with the conventional arrangement of universal joint and sliding spline disposed at the front end of the propeller shaft of a motor vehicle, and in which:

FIGURE 1 is a side view of one of the embodiments in part axial cross-section,
FIGURE 2 is a cross-sectional view of a bellows of the arrangement of FIGURE 1 to a larger scale,
FIGURE 3 is a view generally similar to FIGURE 1 of another of the embodiments,
FIGURE 4 is a cross-sectional view of a bellows of the arrangement of FIGURE 3 to a larger scale, and
FIGURE 5 is a view similar to FIGURE 3 of the other embodiment.

In accordance with common practice, and as shown more particularly in FIGURE 1, the sliding spline 1 of each embodiment is formed at the end of a forwardly projecting male portion 2 of the propeller shaft and the spline yoke 3 also forms the rear yoke member of the front universal joint of the propeller shaft. The spline yoke 3 has the inner end of its bore closed by a blanking plate 4 as usual but, contrary to the usual practice, the normal small air-escape hole is eliminated therefrom. Also contrary to the usual practice, the other end of the spline yoke 3 is not provided with a felt ring, split ring and screw ferrule to form a seal around the forwardly projecting male portion of the shaft 2, the splinded section 1 of which works within the splined bore 5 of the spline yoke 3.

In each arrangement one end of a bellows 6 is sealed to the yoke 3 by means of a clamping ring 7, and the other end of the bellows 6 is sealed to the unsplined section of the forwardly projecting male portion 2 of the propeller shaft by a clamping ring or collar 8. The bellows 6 is moulded in a partially axially collapsed state, as shown in FIGURES 2 and 4, in which, when it is disposed around the aforesaid male portion 2, it encloses a larger volume of air than when axially extended; it is drawn out into its extended position when being sealed to the shaft portion 2 but tends to reassume its partially axially collapsed state as the male spline 1 is withdrawn from the splined bore 5 of the spline yoke 3 of the universal joint. Thus, as the male spline 1 moves towards the closed end of the bore 5, air and lubricant escape past the splines and into the bellows 6, passage of air and lubricant in the reverse direction taking place when the male spline 1 is withdrawn from the spline yoke 3 again.

The bellows 6 is in each case formed with tubular cylindrical end sections 9 and 10 having inner diameters suitable respectively for sealing to the outer surfaces of the yoke 3 and the shaft portion 2. At its inner end the bellows 6 of FIGURES 1 and 2 has a radially inwardly directed flange 11 which abuts the open end of the yoke 3 to provide axial location on the latter during assembly, and the sections 9 and 10 are joined by a single convolution section 12. The peak of this convolution is thickened at 13 to produce a centralising effect about the axis of the shaft portion 2 so that the effect of lubricant inside the bellows 6 does not produce an unbalanced force during rotation of the propeller shaft.

With the bellows 6 of the arrangements of FIGURES 3 and 4 and FIGURE 5, the sections 9 and 10 are joined by a convoluted section 14 comprising a plurality of convolutions. Such an arrangement provides a long chamber in the axial sense for the reception of a considerable volume of lubricant for a relatively small overall diameter. In order that the bellows should be accurately located with respect to the axis of the splined shaft portion 2, the convoluted section is formed so that the troughs of the bellows 6 lie closely against the cylindrical surface of the male splined portion 2. It is also necessary to provide an air passage from one end of the bellows section 14 to the other and, in order to meet both requirements, the bellows section 14 is made of helical form and has a helical coil spring 15 moulded into the troughs of the convolutions. To accommodate the spring 15 the troughs are thickened at their inner radius as at 16.

In order to facilitate the transfer of air and lubricant from the closed end of the splined yoke 3 to the bellows 6 and vice versa in the arrangement of FIGURE 5, one of the splines is removed as at 17 in order to provide a passageway of greater cross-section than is provided by the normal clearance between the splines and spline-ways. A spline may similarly be removed in each of the other arrangements.

The arrangement in each of the embodiments is such that the sum of the clearance volumes between the male spline 1 and the closed end of the bore 5 in the spline yoke 3 and between the male spline and shaft portion 2 and the bellows 6 is always substantially the same, whatever the relative axial positions of the shaft portion 2 and spline yoke 3.

The splined section 1 of the shaft portion 2 of the embodiment of FIGURE 5 has the same outer diameter as the unsplined section, so that it is allowable for the section 1 to be partially withdrawn from the yoke 3 into the bellows section 14. In the arrangement of FIGURE 3 however, the splined section 1 has a larger outer diameter than the unsplined section of the shaft portion 2 so that if the section 1 were withdrawn from the yoke 3 it would foul the bellows section 14. To prevent this happening, a circlip 18 is let into the bore 5 adjacent the outer end of the latter for engagement with the rear end of the section 1 to prevent withdrawal of the latter from the yoke 3.

I claim:

1. A mechanism embodying a lubricating arrangement, comprising a cylinder the inner end of which is closed, a plunger slidable within said cylinder and projecting from the other end of the latter to leave a clearance volume between the plunger and the closed end of the cylinder, and means defining a lubricant retaining chamber between said other end of said cylinder and said plunger, said chamber being permanently in communication with the clearance volume in said cylinder and the construction being such that as said clearance volume varies during sliding movement of said plunger the volume of said chamber varies in the inverse sense so that the sum of said volumes remains substantially constant.

2. A mechanism according to claim 1, wherein said means defining said chamber comprise a flexible bellows, the ends of said bellows being respectively sealed to said plunger and said other end of said cylinder and the formation of said bellows and the assembly thereof in relation to said plunger being such that the internal volume thereof increases as a result of axial compression of said bellows throughout the range of movement of said plunger.

3. A mechanism embodying a lubricating arrangement, comprising a cylinder the inner end of which is closed, a plunger slidable within said cylinder and projecting from the other end of the latter, and a flexible bellows mounted around said plunger with its ends respectively sealed to the latter and said other end of said cylinder to define a lubricant retaining chamber in permanent communication with the clearance volume in the closed end of said cylinder, the construction of said bellows and the assembly thereof with respect to said plunger being such that the internal volume thereof increases as a result of axial compression during sliding movement of said plunger into said cylinder in a manner such that the sum of said clearance and internal volumes remains substantially constant throughout said movement.

4. A mechanism according to claim 3, wherein said bellows has a single convolution.

5. A mechanism according to claim 3, wherein said bellows has a plurality of convolutions and is of helical form to provide a free space between said ends of the bellows.

6. A mechanism embodying a lubricating arrangement, comprising a cylinder the inner end of which is closed, a plunger slidable within said cylinder and projecting from the other end of the latter, said cylinder and plunger being in splined engagement so that they rotate in driving engagement one with the other, and a flexible bellows mounted around said plunger with its ends respectively sealed to the latter and said other end of said cylinder to define a lubricant retaining chamber in permanent communication with the clearance volume in the closed end of said cylinder, the construction of said bellows and the assembly thereof with respect to said plunger being such that the internal volume thereof increases as a result of axial compression during sliding movement of said plunger into said cylinder and the sum of said clearance and internal volumes remains substantially constant.

7. A mechanism according to claim 6, wherein means are provided to support said bellows and accurately locate the latter about the longitudinal axis of said plunger so that lubricant retained therein does not produce an unbalanced force during rotation of said mechanism.

8. A mechanism according to claim 6, wherein said bellows has a single convolution the peak of which is thickened to produce a centralising effect about the longitudinal axis of said plunger during rotation of said mechanism.

9. A motor vehicle propeller shaft, comprising a splined male portion, a universal joint one yoke member of which has a splined bore within which said male portion is slidably engaged and the inner end of which is closed to provide a clearance volume between said closed inner end and said male portion, and a flexible bellows mounted around said male portion with its ends respectively sealed to the latter and the outer end of said splined bore to define a lubricant retaining chamber in permanent communication with the clearance volume in said bore, the construction of said bellows and the assembly thereof with respect to said plunger being such that the internal volume thereof increases as a result of axial compression during sliding movement of said male portion into said bore in a manner such that the sum of said clearance and internal volumes remains substantially constant.

10. A mechanism embodying a lubricating arrangement, comprising a cylinder the inner end of which is closed, a plunger slidable within said cylinder and projecting from the other end of the latter to provide a clearance volume at said inner end of the cylinder, said cylinder and plunger being in splined engagement so that they rotate in driving engagement one with the other, and a flexible bellows mounted around said plunger with its ends respectively sealed to the latter and said other end of said cylinder to define a lubricant retaining chamber in permanent communication with the clearance volume in said cylinder, said bellows being of helical form to provide a free space between said ends of the bellows with a plurality of convolutions formed so that the troughs thereof lie closely against the outer surface of said plunger to centralise said bellows about the longitudinal axis of said plunger and the construction of said bellows and the arrangement thereof with respect to said plunger being such that the internal volume thereof increases as a result of axial compression during sliding movement of said plunger into said cylinder and the sum of said clearance and internal volumes remains substantially constant.

11. A mechanism embodying a lubricating arrangement, comprising a cylinder the inner end of which is closed, a plunger slidable within said cylinder and projecting from the other end of the latter, said cylinder and plunger being in splined engagement so that they rotate in driving engagement one with the other, and a flexible bellows mounted around said plunger with its ends respectively sealed to the latter and said other end of said cylinder to define a lubricant retaining chamber in permanent communication with the clearance volume between said plunger and said cylinder at the inner end of the latter, said bellows being of helical form to provide a free space between said ends of the bellows with a plurality of convolutions formed so that the troughs thereof lie closely against the outer surface of said plunger to centralise said bellows about the longitudinal axis of said plunger, a helical coil spring being moulded into said troughs of said bellows and the construction of said bellows and the arrangement thereof with respect to the plunger being such that the internal volume thereof increases as a result of axial compression during sliding movement of said plunger into said cylinder and the sum of said clearance and internal volumes remains substantially constant.

References Cited in the file of this patent

UNITED STATES PATENTS

| | | |
|---|---|---|
| 1,009,465 | Bowers | Dec. 21, 1911 |
| 1,922,431 | Geyer | Aug. 15, 1933 |
| 1,973,702 | Cooke | Sept. 18, 1934 |
| 2,462,659 | Molotzak | Feb. 22, 1949 |
| 2,867,100 | Beecher | Jan. 6, 1959 |

FOREIGN PATENTS

| | | |
|---|---|---|
| 18,328 | Australia | July 8, 1935 |
| 1,173,797 | France | Oct. 27, 1958 |